United States Patent
Krueger et al.

(10) Patent No.: US 10,481,328 B1
(45) Date of Patent: Nov. 19, 2019

(54) OPTICAL PHASED ARRAY WITH INTEGRATED SECONDARY OPTICS

(71) Applicant: Honeywell International Inc., Morris Plains, NJ (US)

(72) Inventors: Neil A. Krueger, Saint Paul, MN (US); Matthew Wade Puckett, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/162,044

(22) Filed: Oct. 16, 2018

(51) Int. Cl.
| | |
|---|---|
| *G02B 6/122* | (2006.01) |
| *G02B 6/28* | (2006.01) |
| *G02B 27/09* | (2006.01) |
| *G02B 27/00* | (2006.01) |

(52) U.S. Cl.
CPC ............ *G02B 6/1221* (2013.01); *G02B 6/28* (2013.01); *G02B 27/0037* (2013.01); *G02B 27/0961* (2013.01); *G02B 27/0972* (2013.01)

(58) Field of Classification Search
CPC ............ G02B 6/1221; G02B 27/0961; G02B 27/0037; G02B 27/0972; G02B 6/28
See application file for complete search history.

(56) References Cited

U.S. PATENT DOCUMENTS

| | | | |
|---|---|---|---|
| 4,185,891 A | 1/1980 | Kaestner | |
| 7,773,655 B2 | 8/2010 | Chuyanov et al. | |
| 8,615,028 B1 * | 12/2013 | Sayyah | H01S 5/423 372/50.1 |
| 8,711,894 B2 | 4/2014 | Chuyanov et al. | |
| 8,804,246 B2 | 8/2014 | Wolak et al. | |

\* cited by examiner

*Primary Examiner* — John Bedtelyon
(74) *Attorney, Agent, or Firm* — Fogg & Powers LLC

(57) ABSTRACT

An optical phased array comprises a substrate layer having a substantially planar surface, a plurality of emitters on the surface of the substrate, and at least one cladding layer over the emitters. A plurality of optics components coupled to the cladding layer is located a predetermined distance away from the emitters, with the optics components in optical communication with the emitters. The optics components comprise a first set of optics configured for angular correction of light beams emitted from the emitters, and a second set of optics separated from the first set of optics, the second set of optics configured for divergence enhancement of the light beams transmitted from the first set of optics. Alternatively, the optics components comprise a combined set of optics configured for angular correction of light beams emitted from the emitters, and for divergence enhancement of the light beams transmitted from the combined set of optics.

20 Claims, 7 Drawing Sheets

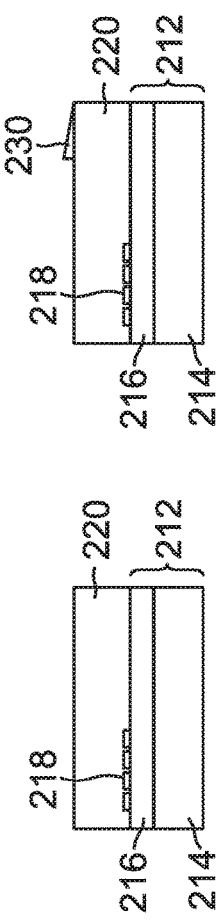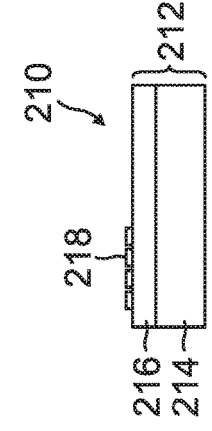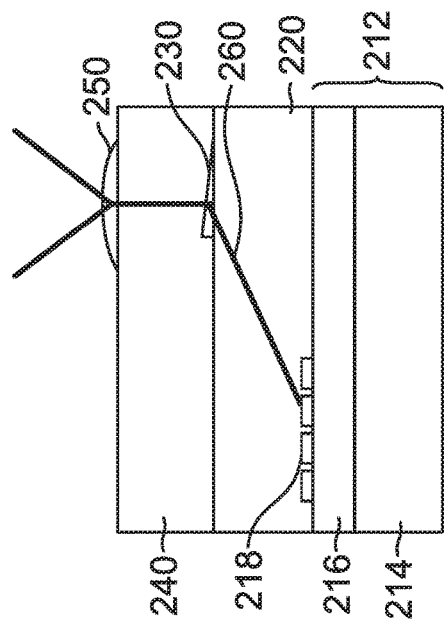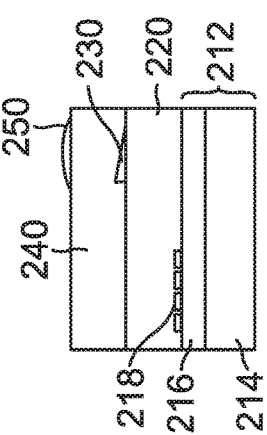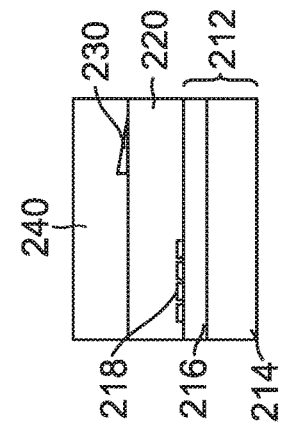

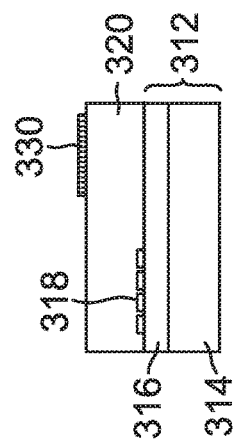
FIG. 3A
FIG. 3B
FIG. 3C
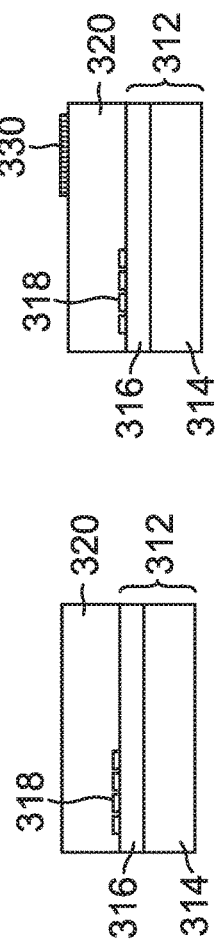
FIG. 3D
FIG. 3E
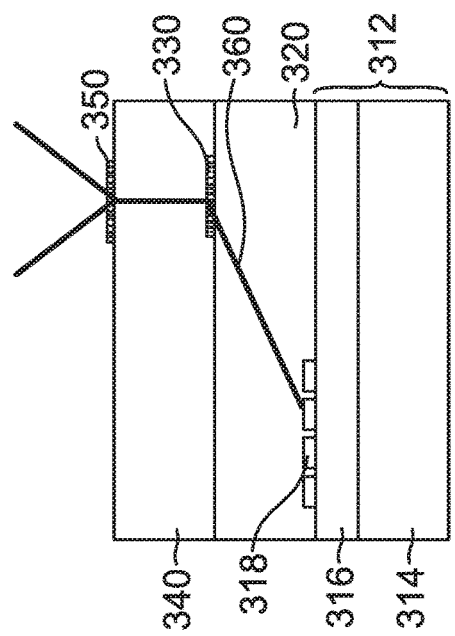
FIG. 3F

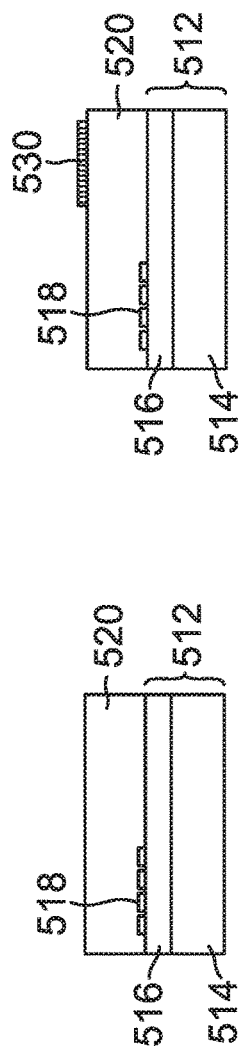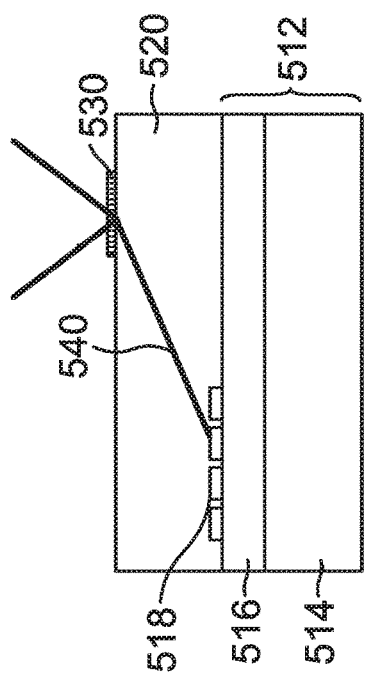

US 10,481,328 B1

OPTICAL PHASED ARRAY WITH INTEGRATED SECONDARY OPTICS

BACKGROUND

Optical phased arrays are an important, continuously growing technological field owing to the continued interest in pointing and steering optical beams. Applications utilizing beam steering range from free-space optical communications (FSOC) to light detection and ranging (LiDAR).

The performance of optical phased arrays is currently limited by a couple of factors. The first limitation is how closely packed emitters within an optical phased array can be placed without introducing optical cross-talk. The second limitation is that the overall steering range of the optical phased array is governed by the beam divergence at the individual emitter level.

Accordingly, there is a need to address the above limitations in order to improve the performance of optical phased arrays.

SUMMARY

An optical phased array comprises a substrate layer having a substantially planar surface, a plurality of emitters on the planar surface of the substrate, and at least one cladding layer over the plurality of emitters. A plurality of optics components is coupled to the at least one cladding layer and located a predetermined distance away from the plurality of emitters, and the plurality of optics components is in optical communication with the plurality of emitters. The plurality of optics components comprise a first set of optics configured for angular correction of light beams emitted from the plurality of emitters, and a second set of optics separated from the first set of optics, with the second set of optics configured for divergence enhancement of the light beams transmitted from the first set of optics. Alternatively, the plurality of optics components comprise a combined set of optics configured for angular correction of light beams emitted from the plurality of emitters, and for divergence enhancement of the light beams transmitted from the combined set of optics.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIGS. 2A-2E are cross-section views of a method of fabricating a single integrated photonic emitter for an optical phased array with integrated secondary optics, according to one implementation;

FIG. 2F is a cross-section view showing the operation of the single integrated photonic emitter fabricated according to FIGS. 2A-2E;

FIGS. 3A-3E are cross-section views of a method of fabricating a single integrated photonic emitter for an optical phased array with integrated secondary optics, according to another implementation;

FIG. 3F is a cross-section view showing the operation of the single integrated photonic emitter fabricated according to FIGS. 3A-3E;

FIGS. 5A-5C are cross-section views of a method of fabricating a single integrated photonic emitter for an optical phased array with integrated secondary optics, according to another alternative implementation;

FIG. 5D is a cross-section view showing the Operation of the single integrated photonic emitter fabricated according to FIGS. 5A-5C;

DETAILED DESCRIPTION

Figure 1:
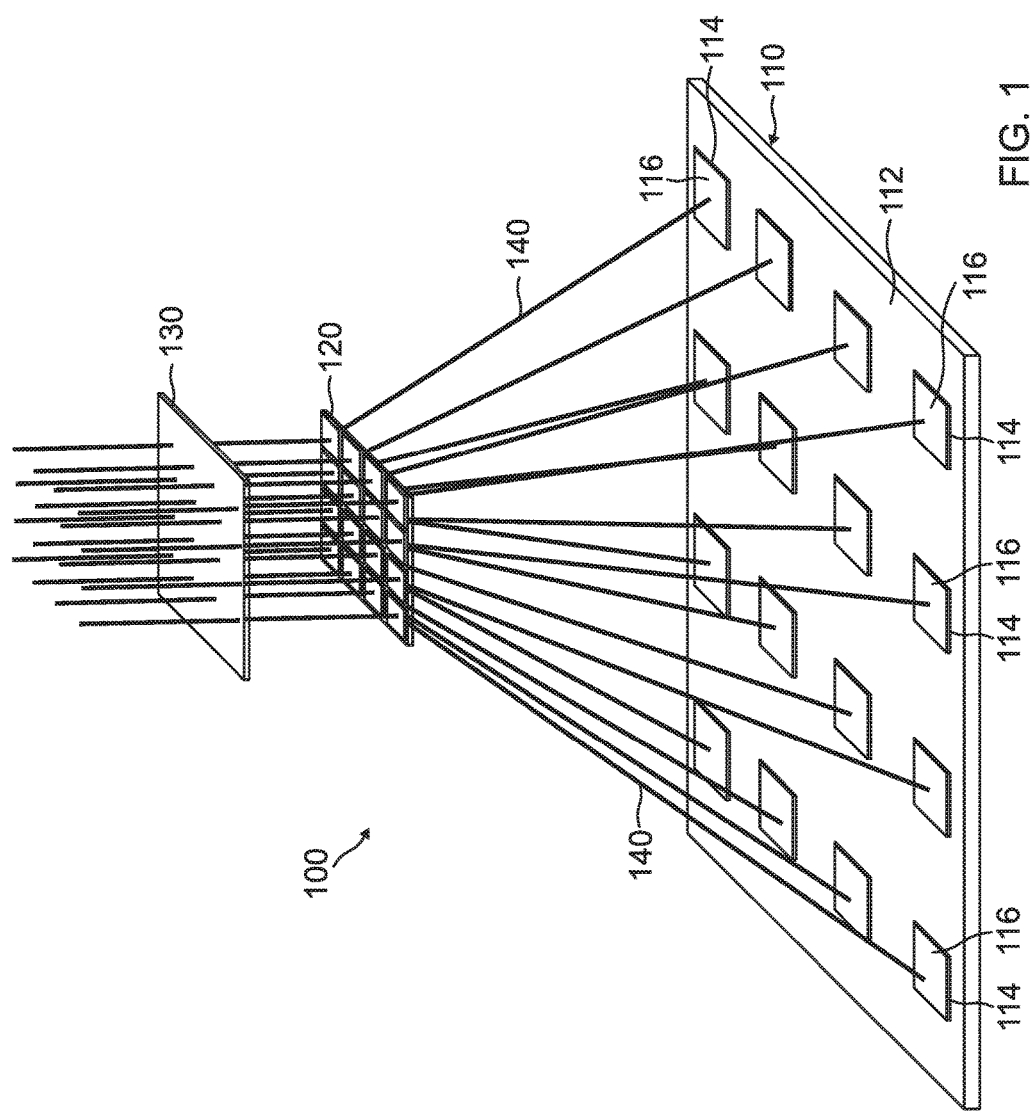
FIG. 1 is a schematic diagram of an optical phased array with secondary optics, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Various embodiments of an optical phased array with integrated secondary optics are described herein. The integrated secondary optics provide for reducing the effective pitch and enhancing steering range of the optical phased array, such as an on-chip optical phased array. Reducing the effective pitch essentially reduces the effective spacing between emitter elements of the optical phased array.

As explained above, the performance of an optical phased array is limited by how closely packed emitters can be placed in the array without introducing optical cross-talk, and limited in that the overall steering range is governed by the beam divergence at the individual emitter level. The present approach seeks to remedy these limitations by reducing the overall effective pitch of the optical phased array, while simultaneously introducing the opportunity to increase individual emitter divergence, thus increasing the steering range. These improvements can be achieved by adding secondary optics over an integrated photonic optical phased array. This in turn improves the optical phased array performance while maintaining a small device volume due to the highly-integrated nature of the architecture.

The optical phased array with integrated secondary optics can be formed by initially fabricating an integrated photonic optical phased array using standard microfabrication techniques, to produce a two-dimensional (2D) grid emitter layout on a microchip, for example. In one embodiment, the optical phased array can be formed with waveguides and thereto-optic phase shifters for beam steering, with the waveguides utilizing a low refractive index cladding material. In addition, a collection of optical grating couplers can be used to take light from the guided mode in the waveguides and emit the light as a free-space beam. The free-space beams from the grating couplers overlap in the far-field, and the relative phase difference between each of these beams shifts this far-field pattern, allowing for beam steering.

The secondary optics is formed to enhance the beam steering range while reducing the effective spacing between emitter elements. In order to reduce the effective pitch of the optical phased array, the direction of the free-space beam emitted from each of the grating couplers is not perpendicular to the grating couplers, but rather is at some unique angle. This unique angle corresponds to the free-space beam landing upon a specific "pixel" within a secondary "angular correction" optic, with the pitch of the angular correction optic pixels being greatly reduced (e.g., 5×) as compared to the pitch of the emitter grid of the optical phased array. Each secondary angular correction optic pixel is designed to accept light at this unique angle and refract the light such that the beams exiting each pixel are now all parallel to one another.

While the reduced pitch enhances beam steering range, so too can increased divergence of light emanating from the optical phased array. This can be accomplished with an additional secondary "divergence enhancement" optic also exhibiting refractive power. The divergence enhancement optic is configured to receive the parallel beams from the angular correction optic, and provide further control of a far-field beam profile.

The secondary optics can be formed using bulk optical materials, such as in the form of prisms or lenses. These can be manufactured by direct-laser writing, or photolilthography and reflow of photoresist, for example. In other embodiments, the secondary optics can be in the form of diffractive optics such as blazed gratings or Fresnel lenses.

Alternatively, the secondary optics can be formed using metamaterials such as metasurfaces comprising meta-atoms. Meta-atoms are nanostructures with sub-wavelength dimensions that exhibit size-dependent perturbations to a transmitted and/or reflected optical field. The size-dependent phase response of meta-atoms enables them to mimic the spatially-varying phase response of bulk optics, such as prisms, lenses, or combinations thereof, by encoding various optical functions by strategically sizing meta-atoms of the proper size. Such sub-wavelength nanostructures collectively act as anomalous refractive optics. Metasurfaces can be formed by nanofabricating distributed sub-wavelength features that collectively behave as a lens, positive or negative in nature, for example. The sub-wavelength features control the wavefront of light. Usable materials for making metasurface include, for example, polymers/dielectrics, semiconductors, and metals.

Alternatively, the angular correction and divergence enhancement optics can be combined into a single integrated, monolithic entity within the optical phased array architecture. This combined optics architecture is configured to redirect a beam and make the beam more divergent.

The optical phased array with secondary optics is particularly useful in light detection and ranging (LiDAR) systems that use beam steering. The present embodiments allow for less moving parts in order to steer the beams of such LiDAR systems, compared to conventional LiDAR systems that use various mechanical devices to provide for beam steering.

Further details of various embodiments are described hereafter with reference to the drawings.

FIG. 1 schematically illustrates an optical phased array 100, according to one embodiment. The optical phased array 100 includes a substrate 110 having a substantially planar surface 112, such as a microchip. A plurality of emitters 114 is located on substrate 110, and includes output grating couplers 116 on surface 112, as well as other optical components, such as waveguides and phase shifters (not shown). In one embodiment, emitters 114 can be formed in a micro-array two-dimensional (2D) grid pattern such as shown in FIG. 1, with emitters 114 separated from each other by a distance of about 10 µm, for example.

A first set of optics 120 is located a predetermined distance away from emitters 114 and is in optical communication with emitters 114. The optics 120 is configured for angular correction of light beams emitted from emitters 114. In one implementation, optics 120 can be coupled to a first cladding layer that is optically transmissive and formed over emitters 114. The optics 120 can be in the form of a prism, a metasurface, or the like.

A second set of optics 130 is separated from the first set of optics 120, with optics 130 configured for divergence enhancement of the light beams transmitted from optics 120. In one implementation, optics 130 is coupled to a second cladding layer that is optically transmissive and formed over optics 120 and the first cladding layer. The optics 130 can be in the form of a microlens array, a metasurface, or the like.

During operation, a beam 140 is emitted from each grating coupler 116 at a unique angle to land upon optics 120, such as a specific pixel of an angular correction metasurface, for example. The angular correction optic (e.g., metasurface) acts on each beam 140 such that the beams propagate in parallel. This results in the pitch between the beams transmitted by optics 120 being substantially reduced compared to the pitch between the beams at substrate 110. The optics 130 for divergence enhancement of the beams adds further control of a far-field profile.

In an alternative embodiment, the optics 120 and 130 can be replaced with a single set of optics, which is configured for both angular correction of light beams emitted from emitters 114 and for divergence enhancement of the light beams transmitted from the single set of optics. For example, a single metasurface can be configured to perform both angular and divergence control of the emitted beams.

FIGS. 2A-2E illustrate cross-section views of a method of fabricating a single integrated photonic emitter for an optical phased array, according to one implementation. Although fabrication of a single emitter is illustrated, it should be understood that the method is applicable to forming multiple emitters for the optical phased array.

As shown in FIG. 2A, an optical phased array substrate 210 is initially fabricated, such as by using standard microfabrication processes. The optical phased array substrate 210 is fabricated from a planar substrate layer 212, which includes a base layer 214, and a first cladding layer 216 that is formed over base layer 214. An emitter is formed on substrate layer 212, and includes an output grating coupler 218 coupled to cladding layer 216, as well as other optical components, such as a waveguide and a phase shifter (not shown).

In an example embodiment, substrate layer 212 can be composed of silicon, and cladding layer 216 can be composed of silicon dioxide. The emitter can be formed with a silicon nitride waveguide, and a thermo-optic phase shifter for beam steering. In one embodiment, the phase shifter comprises a micro-heater that locally tunes optical phase in a routing waveguide via the thermo-optic effect. The silicon nitride waveguide utilizes the silicon dioxide of cladding layer 216. The grating coupler 218 can be composed of silicon nitride.

As shown in FIG. 2B, a second cladding layer 220 is formed over grating coupler 218 and first cladding layer 216. The second cladding layer 220 is optically transmissive, and can be composed of silicon dioxide, for example. The second cladding layer 220 can be formed using standard deposition techniques, such as chemical vapor deposition (CVD) or plasma-enhanced chemical vapor deposition (PCVD). The second cladding layer 220 can be formed to have a thickness of about 1 µm to about 10 µm.

As depicted in FIG. 2C, an angular correction optic 230 is formed on second cladding layer 220. The angular correction optic 230 can be an angle-correct pixel, such as part of a direct-laser written prism for the optical phased array. Such a direct-laser written prism can be formed using microscale three-dimensional (3D) printing techniques, for example. It should be noted that planarization (e.g., by chemical-mechanical polishing) of the top surface of the second cladding layer 220 may be necessary to provide a flat surface for fabricating the angular correction optic 230.

As illustrated in FIG. 2D, a third cladding layer 240 is formed over angular correction optic 230 and second cladding layer 220. The third cladding layer 240 is optically transmissive, and can be composed of silicon dioxide, for example. The third cladding layer 240 can be formed using standard deposition techniques. The third cladding layer 240 can be formed to have a thickness of about 1 µm to about 10 µm.

As shown in FIG. 2E, a divergence enhancement optic 250 is formed on third cladding layer 240. The divergence enhancement optic 250 can be a divergence-increasing optic, such part of a direct-laser written lens for the optical phased array, for example. Such a direct-laser written lens can be formed using microscale 3D printing techniques, for example.

FIG. 2F shows the operation of the single integrated photonic emitter for the optical phased array, fabricated according to FIGS. 2A-2E. The grating coupler 218 is configured to take light from the guided mode in the waveguide and emit a beam 260 at a unique angle that lands upon angular correction optic 230. The angular correction optic 230 acts on beam 260 to redirect the beam in the normal direction, such that the beam then propagates in parallel with other beams (not shown) of the optical phased array, to divergence enhancement optic 250. The divergence enhancement optic 250 adds further control to a far-field profile of the beam by providing an enhanced steering range.

FIGS. 3A-3E illustrate cross-section views of a method of fabricating a single integrated photonic emitter for an optical phased array, according to another implementation. Although fabrication of a single emitter is illustrated, it should be understood that the method is applicable to forming multiple emitters for the optical phased array.

As shown in FIG. 3A, an optical phased array substrate 310 is initially fabricated, such as by using standard microfabrication processes. The optical phased array substrate 310 is fabricated from a planar substrate layer 312, which includes a base layer 314, and a first cladding layer 316 that is formed over base layer 314. An emitter is formed on substrate layer 312, and includes an output grating coupler 318 coupled to cladding layer 316, as well as other optical components, such as a waveguide and a phase shifter (not shown). The components of optical phased array substrate 310 can be formed using the same types of materials as described previously for corresponding components of optical phased array substrate 210 (FIG. 2A).

As depicted in FIG. 3B, a second cladding layer 320 is formed over grating coupler 318 and first cladding layer 316. The second cladding layer 320 is optically transmissive, and can be composed of silicon dioxide, for example. The second cladding layer 320 can be formed using standard deposition techniques. The second cladding layer 320 can be formed to have a thickness of about 1 µm to about 10 µm.

As shown in FIG. 3C, an angular correction optic 330 is formed on second cladding layer 320. The angular correction optic 330 can be an angle-correct pixel formed as part of a nano-fabricated sub-wavelength array, such as a metasurface, for example. It should be noted that planarization of the top surface of the second cladding layer 320 may be necessary to provide a flat surface for fabricating the angular correction optic 330.

As illustrated in FIG. 3D, a third cladding layer 340 is formed over angular correction optic 330 and second cladding layer 320. The third cladding layer 340 is optically transmissive, and can be composed of silicon dioxide, for example. The third cladding layer 340 can be formed using standard deposition techniques. The third cladding layer 340 can be formed to have a thickness of about 1 µm to about 10 µm.

As shown in FIG. 3E, a divergence enhancement optic 350 is formed on third cladding layer 340. The divergence enhancement optic 350 can be a divergence-enhancing pixel formed as part of a nano-fabricated sub-wavelength array, such as a metasurface, for example.

FIG. 3F shows the operation of the single integrated photonic emitter for the optical phased array, fabricated according to FIGS. 3A-3E. The grating coupler 318 is configured to take light from the guided mode in the waveguide and emit a beam 360 at a unique angle that lands upon angular correction optic 330. The angular correction optic 330 acts on beam 360 to redirect the beam in the normal direction, such that the beam then propagates in parallel with other beams (not shown) of the optical phased array, to divergence enhancement optic 350, which adds further control to a far-field profile of the beam.

Figure 4A:
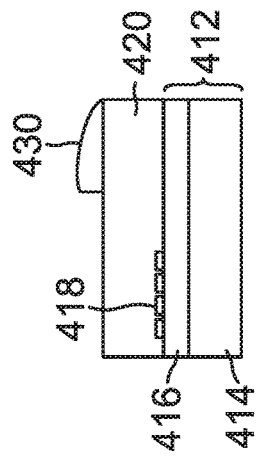
FIGS. 4A-4C are cross-section views of a method of fabricating a single integrated photonic emitter for an optical phased array with integrated secondary optics, according to an alternative implementation.
Figure 4B:
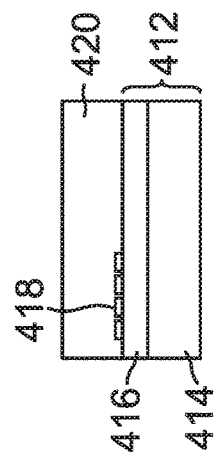
Figure 4C:
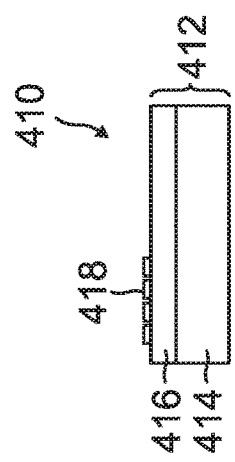

FIGS. 4A-4C illustrate cross-section views of a method of fabricating a single integrated photonic emitter for an optical phased array, according to an alternative implementation. Although fabrication of a single emitter is illustrated, it should be understood that the method is applicable to forming multiple emitters for the optical phased array.

As shown in FIG. 4A, an optical phased array substrate 410 is initially fabricated, such as by using standard microfabrication processes. The optical phased array substrate 410 is fabricated from a planar substrate layer 412, which includes a base layer 414, and a first cladding layer 416 that is formed over base layer 414. An emitter is formed on substrate layer 412, and includes an output grating coupler 418 coupled to cladding layer 416, as well as other optical components, such as a waveguide and a phase shifter (not shown). The components of optical phased array substrate 410 can be formed using the same types of materials as described previously for corresponding components of optical phased array substrate 210 (FIG. 2A).

As depicted in FIG. 4B, a second cladding layer 420 is formed over grating coupler 418 and first cladding layer 416. The second cladding layer 420 is optically transmissive, and can be composed of silicon dioxide, for example. The second cladding layer 420 can be formed using standard deposition techniques. The second cladding layer 420 can be formed to have a thickness of about 1 µm to about 10 µm.

As illustrated in FIG. 4C, a combined angular correction and divergence enhancement optic 430 is formed on second cladding layer 420, and can be an angle-correct/divergence-enhancing pixel formed as part of a direct-laser written prism/lens for the optical phased array, for example. It should be noted that planarization of the top surface of the second cladding layer 420 may be necessary to provide a flat surface for fabricating the combined angular correction and divergence enhancement optic 430.

Figure 4D:
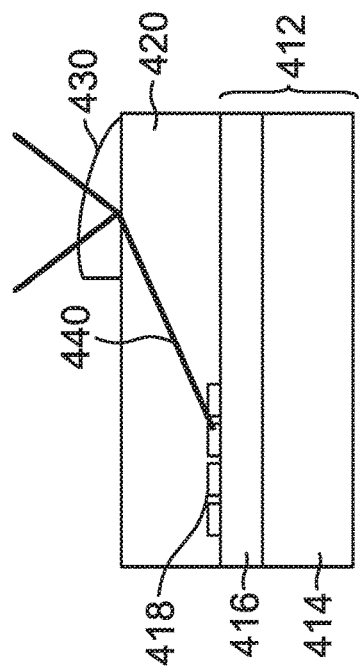
FIG. 4D is a cross-section view showing the operation of the single integrated photonic emitter fabricated according to FIGS. 4A-4C.

FIG. 4D shows the operation of the single integrated photonic emitter for the optical phased array, fabricated according to FIGS. 4A-4C. The grating coupler 418 is configured to take light from the guided mode in the waveguide and emit a beam 440 at a unique angle that lands upon angular correction and divergence enhancement optic 430. The angular correction and divergence enhancement optic 430 acts on beam 440 to provide both angular and divergence control of the beam.

FIGS. 5A-5C illustrate cross-section views of a method of fabricating a single integrated photonic emitter for an optical phased array, according to another alternative implementation. Although fabrication of a single emitter is illustrated, it should be understood that the method is applicable to forming multiple emitters for the optical phased array.

As shown in Figure 5A, an optical phased array substrate 510 is initially fabricated, such as by using standard microfabrication processes. The optical phased array substrate 510 is fabricated from a planar substrate layer 512, which includes a base layer 514, and a first cladding layer 516 that is formed over base layer 514. An emitter is formed on substrate layer 512, and includes an output grating coupler 518 coupled to cladding layer 516, as well as other optical components, such as a waveguide and a phase shifter (not shown). The components of optical phased array substrate 510 can be formed using the same types of materials as described previously for corresponding components of optical phased array substrate 210 (FIG. 2A).

As depicted in FIG. 5B, a second cladding layer 520 is formed over grating coupler 518 and first cladding layer 516. The second cladding layer 520 is optically transmissive, and can be composed of silicon dioxide, for example. The second cladding layer 520 can be formed using standard deposition techniques. The second cladding layer 520 can be formed to have a thickness of about 1 to about 10 µm.

As illustrated in FIG. 5C, a combined angular correction and divergence enhancement optic 530 is formed on second cladding layer 520, and can be an angle-correct/divergence-enhancing pixel formed as part of a nano-fabricated sub-wavelength array, such as a metasurface, for example. It should be noted that planarization of the top surface of the second cladding layer 520 may be necessary to provide a flat surface for fabricating the combined angular correction and divergence enhancement optic 530.

FIG. 5D shows the operation of the single integrated photonic emitter for the optical phased array, fabricated according to FIGS. 5A-5C. The grating coupler 518 is configured to take light from the guided mode in the waveguide and emit a beam 540 at a unique angle that lands upon angular correction and divergence enhancement optic 530. The angular correction and divergence enhancement optic 530 acts on beam 540 to provide both angular and divergence control of the beam.

Figure 6A:
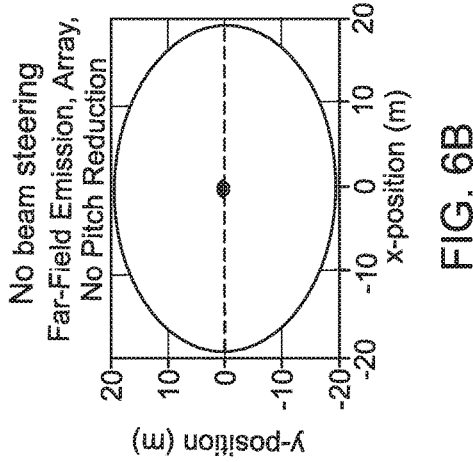
FIG. 6A is a simulated near-field emission diagram for a conventional optical phased array, with no pitch reduction.
Figure 6B:
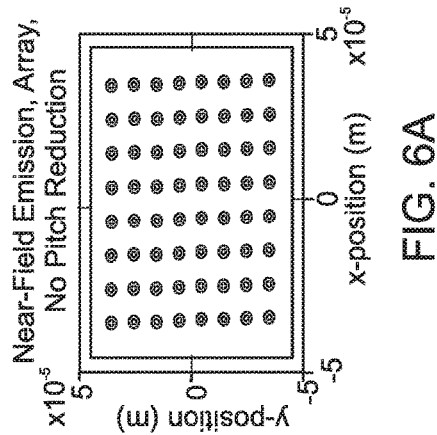
FIG. 6B is a simulated far-field emission diagram for the conventional optical phased array, with no pitch reduction and no steering.
Figure 6C:
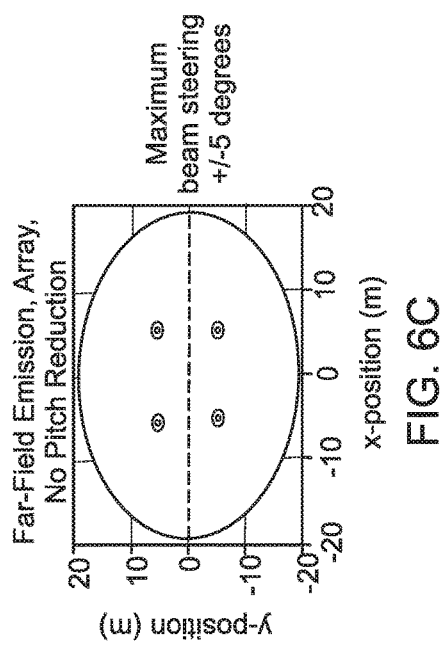
FIG. 6C is a simulated far-field emission diagram for the conventional optical phased array, with no pitch reduction and maximum steering.

FIGS. 6A-6C are simulated near-field and far-field emission diagrams for a conventional optical phased array. These are compared with the simulated near-field and far-field emission diagrams of FIGS. 7A-7C for an optical phased array with secondary optics, in the following discussion.

FIG. 6A is a simulated near-field emission diagram for the conventional optical phased array, with no pitch reduction. The pitch of the structure is restricted by spacing requirements between adjacent routing waveguides and emitters to avoid undesired cross-talk. FIG. 6B is a simulated far-field emission diagram for the conventional optical phased array, with no pitch reduction and no beam steering. FIG. 6C is a simulated far-field emission diagram for the conventional optical phased array, with no pitch reduction and maximum beam steering. FIG. 6C shows that for a given propagation distance (e.g., 100 m), the maximum beam steering range is plus or minus 5 degrees.

Figure 7A:
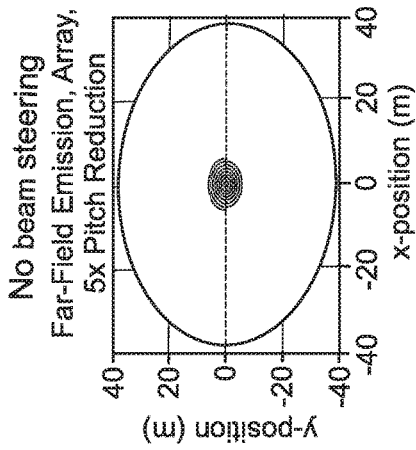
FIG. 7A is a simulated near-field emission diagram for an optical phased array with secondary optics, with pitch reduction.
Figure 7B:
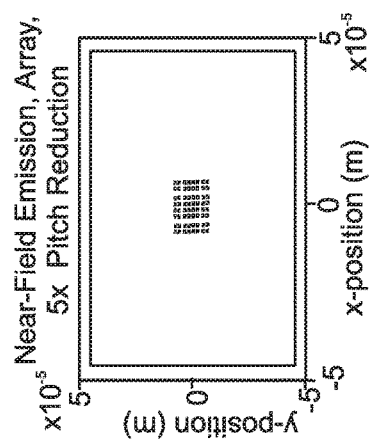
FIG. 7B is a simulated far-field emission diagram for the optical phased array with secondary optics, with pitch reduction and no steering.
Figure 7C:
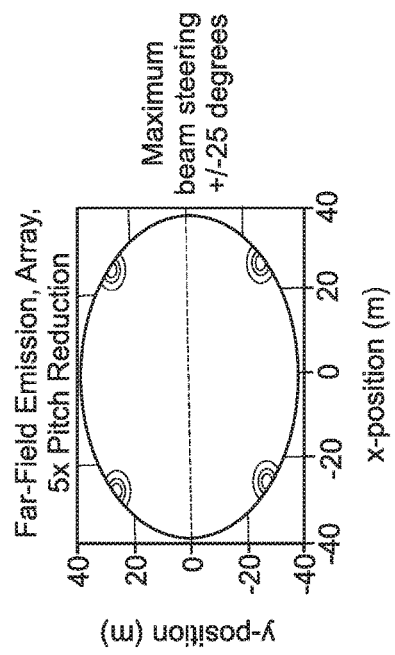
FIG. 7C is a simulated far-field emission diagram for an optical phased array with secondary optics, with pitch reduction and maximum steering.

FIG. 7A is a simulated near-field emission diagram for the optical phased array with secondary optics, showing a 5× reduction in pitch, compared to the pitch of the optical phased array in FIG. 6A. FIG. 7B is a simulated far-field emission diagram for the optical phased array with secondary optics, with the 5× reduction in pitch and no beam steering. FIG. 7B shows that a more divergent beam pattern is produced compared to the beam pattern of the optical phased array in FIG. 6B as a result of a smaller effective system aperture. FIG. 7C is a simulated far-field emission diagram for the optical phased array with secondary optics, with the 5× reduction in pitch and maximum beam steering. FIG. 7C shows that for a given propagation distance (e.g., 100 m), the maximum beam steering range is plus or minus 25 degrees. This is a 5× increase in the beam steering range compared to the beam steering range of the conventional optical phased array shown in FIG. 6C.

EXAMPLE EMBODIMENTS

Example 1 includes an optical phased array, comprising: a substrate layer having a substantially planar surface; a plurality of emitters on the planar surface of the substrate; at least one cladding layer over the plurality of emitters; a plurality of optics components coupled to the at least one cladding layer and located a predetermined distance away from the plurality of emitters, the plurality of optics components in optical communication with the plurality of emitters; wherein the plurality of optics components comprise: a first set of optics configured for angular correction of light beams emitted from the plurality of emitters, and a second set of optics separated from the first set of optics, the second set of optics configured for divergence enhancement of the light beams transmitted from the first set of optics; or a combined set of optics configured for angular correction of light beams emitted from the plurality of emitters, and for divergence enhancement of the light beams transmitted from the combined set of optics.

Example 2 includes the optical phased array of Example 1, wherein the substrate comprises a microchip.

Example 3 includes the optical phased array of any of Examples 1-2, wherein the emitters have a two-dimensional grid layout on the substrate.

Example 4 includes the optical phased array of any of Examples 1-3, wherein the emitters each include an output grating coupler in optical communication with a waveguide and a phase shifter.

Example 5 includes the optical phased array of Example 4, wherein the output grating coupler and the waveguide comprise silicon nitride, and the phase shifter comprises a micro-heater that locally tunes optical phase in a routing waveguide via the thermo-optic effect.

Example 6 includes the optical phased array of any of Examples 1-5, wherein the at least one cladding layer comprises an optically transmissive material.

Example 7 includes the optical phased array of any of Examples 1-6, wherein the first set of optics configured for angular correction comprises a prism, and the second set of optics configured for divergence enhancement comprises a microlens array.

Example 8 includes the optical phased array of any of Examples 1-6, wherein the first set of optics configured for angular correction comprises a first metasurface, and the second set of optics configured for divergence enhancement comprises a second metasurface.

Example 9 includes the optical phased array of any of Examples 1-6, wherein the combined set of optics configured for angular correction and divergence enhancement comprises a prism.

Example 10 includes the optical phased array of any of Examples 1-6, wherein the combined set of optics configured for angular correction and divergence enhancement comprises a metasurface.

Example 11 includes a method of fabricating an optical phased array, the method comprising: providing a substrate having a substantially planar surface; forming a plurality of emitters on the planar surface of the substrate; depositing a first optically transmissive cladding layer over the emitters; forming angular correction optics on the first cladding layer; depositing a second optically transmissive cladding layer over the angular correction optics; and forming divergence enhancement optics on the second cladding layer.

Example 12 includes the method of Example 11, wherein the substrate comprises a microchip.

Example 13 includes the method of any of Examples 11-12, wherein the angular correction optics comprises a direct-laser written prism; and the divergence enhancement optics comprises a direct-laser written lens.

Example 14 includes the method of any of Examples 11-12, wherein the angular correction optics comprises a first nano-fabricated sub-wavelength array; and the divergence enhancement optics comprises a second nano-fabricated sub-wavelength array.

Example 15 includes the method of any of Examples 11-12, wherein the angular correction optics comprises a first metasurface; and the divergence enhancement optics comprises a second metasurface.

Example 16 includes a method of fabricating an optical phased array, the method comprising: providing a substrate having a substantially planar surface; forming a plurality of emitters on the planar surface of the substrate; depositing a first cladding layer over the emitters; and forming combined angular correction and divergence enhancement optics on the cladding layer.

Example 17 includes the method of Example 16, wherein the substrate comprises a microchip.

Example 18 includes the method of any of Examples 16-17, wherein the combined angular correction and divergence enhancement optics comprises a direct-laser written prism.

Example 19 includes the method of any of Examples 16-17, wherein the combined angular correction and divergence enhancement optics comprises a nano-fabricated sub-wavelength array.

Example 20 includes the method of any of Examples 16-17, wherein the combined angular correction and divergence enhancement optics comprises a metasurface.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An optical phased array, comprising:
   a substrate layer having a substantially planar surface;
   a plurality of emitters on the substantially planar surface of the substrate;
   at least one cladding layer over the plurality of emitters;
   a plurality of optics components coupled to the at least one cladding layer and located a predetermined distance away from the plurality of emitters, the plurality of optics components in optical communication with the plurality of emitters;
   wherein the emitters are configured to emit respective light beams at multiple different angles with respect to the substantially planar surface of the substrate;
   wherein a pitch between the light beams after being transmitted through the optical components is substantially reduced compared to the pitch between the light beams emitted at the substrate layer;
   wherein the plurality of optics components comprise:
      a first set of optics configured for angular correction of light beams emitted from the plurality of emitters, and at least a second optical component separated from the first set of optics, the at least second optical component configured for divergence enhancement of the light beams transmitted from the first set of optics; or
      a combined set of optics configured for angular correction of light beams emitted from the plurality of emitters, and for divergence enhancement of the light beams transmitted from the combined set of optics.

2. The optical phased array of claim 1, wherein the substrate comprises a microchip.

3. The optical phased array of claim 1, wherein the emitters have a two-dimensional grid layout on the substrate.

4. The optical phased array of claim 1, wherein the emitters each include an output grating coupler in optical communication with a waveguide and a phase shifter.

5. The optical phased array of claim 4, wherein the output grating coupler and the waveguide comprise silicon nitride, and the phase shifter comprises a micro-heater that locally tunes optical phase in a routing waveguide via the thereto-optic effect.

6. The optical phased array of claim 1, wherein the at least one cladding layer comprises an optically transmissive material.

7. The optical phased array of claim 1, wherein the first set of optics comprises at least one prism; and the at least second optical component comprises a microlens array.

8. The optical phased array of claim 1, wherein the first set of optics comprises a first metasurface, and the at least second optical component comprises a second metasurface.

9. The optical phased array of claim 1, wherein the combined set of optics comprises at least one prism.

10. The optical phased array of claim 1, wherein the combined set of optics comprises a metasurface.

11. A method of fabricating an optical phased array, the method comprising:
    providing a substrate having a substantially planar surface;

forming a plurality of emitters on the substantially planar surface of the substrate;

depositing a first optically transmissive cladding layer over the emitters;

forming a first set of optics on the first cladding layer;

depositing a second optically transmissive cladding layer over the first set of optics; and forming a second set of optics on the second cladding layer;

wherein the emitters are formed to emit respective light beams at multiple different angles with respect to the substantially planar surface of the substrate;

wherein the first set of optics are formed to act on each of the light beams received from the emitters, such that the light beams propagate in parallel after being transmitted through the first set of optics;

wherein the second set of optics are formed to act on each of the light beams received from the first set of optics, such that the light beams propagate in a divergent manner after being transmitted through the second set of optics.

12. The method of claim 11, wherein the substrate comprises a microchip.

13. The method of claim 11, wherein:
the first set of optics comprises at least one direct-laser written prism; and
the second set of optics comprises at least one direct-laser written lens.

14. The method of claim 11, wherein:
the first set of optics comprises a first nano-fabricated sub-wavelength array; and
the second set of optics comprises a second nano-fabricated sub-wavelength array.

15. The method of claim 11, wherein:
the first set of optics comprises a first metasurface; and
the second set of optics comprises a second metasurface.

16. A method of fabricating an optical phased array, the method comprising:

providing a substrate having a substantially planar surface;

forming a plurality of emitters on the substantially planar surface of the substrate;

depositing a cladding layer over the emitters; and forming a set of optics on the cladding layer;

wherein the emitters are formed to emit respective light beams at multiple different angles with respect to the substantially planar surface of the substrate;

wherein the set of optics are formed to act on each of the light beams such that the light beams propagate in a divergent manner after being transmitted through the set of optics;

wherein a pitch between the light beams transmitted through the set of optics is substantially reduced compared to the pitch between the light beams emitted at the substrate layer.

17. The method of claim 16, wherein the substrate comprises a microchip.

18. The method of claim 16, wherein the set of optics comprises at least one direct-laser written prism.

19. The method of claim 16, wherein the set of optics comprises a nano-fabricated sub-wavelength array.

20. The method of claim 16, wherein the set of optics comprises a metasurface.

* * * * *